United States Patent
Saegusa et al.

(10) Patent No.: US 10,379,213 B2
(45) Date of Patent: Aug. 13, 2019

(54) MOVING BODY ROTATION SPEED MEASUREMENT DEVICE

(71) Applicant: The Yokohama Rubber Co., LTD., Minato-ku, Tokyo (JP)

(72) Inventors: Hiroshi Saegusa, Hiratsuka (JP); Tsuyoshi Kitazaki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 279 days.

(21) Appl. No.: 15/036,676

(22) PCT Filed: Nov. 13, 2013

(86) PCT No.: PCT/JP2013/006674
§ 371 (c)(1),
(2) Date: May 13, 2016

(87) PCT Pub. No.: WO2015/071928
PCT Pub. Date: May 21, 2015

(65) Prior Publication Data
US 2016/0327642 A1    Nov. 10, 2016

(51) Int. Cl.
*G01S 13/58*    (2006.01)
*G01S 13/88*    (2006.01)
*G01S 13/00*    (2006.01)

(52) U.S. Cl.
CPC ............ *G01S 13/583* (2013.01); *G01S 13/88* (2013.01)

(58) Field of Classification Search
CPC ...... G01S 13/583; G01S 13/88; G01S 13/584; A63B 69/3658
See application file for complete search history.

(56) References Cited

U.S. PATENT DOCUMENTS 5,246,232 A * 9/1993 Eccher .............. A63B 69/3658
                                                       342/109
5,401,026 A * 3/1995 Eccher .............. A63B 69/3658
                                                      273/184 R
(Continued)

FOREIGN PATENT DOCUMENTS

EP         2218483 A2 *  8/2010  ......... A63B 69/3658
JP       2003-043141      2/2003
(Continued)

OTHER PUBLICATIONS

Irwin I. Shapiro, "Planetary Radar Astronomy"; "IEEE Spectrum"; vol. 5, No. 3; Mar. 1968; p. 70-79; Print ISSN: 0018-9235. (Year: 1968).*
(Continued)

*Primary Examiner* — Bernarr E Gregory
(74) *Attorney, Agent, or Firm* — Thorpe North & Western

(57) ABSTRACT

Provided is a moving body rotation speed measurement device that makes it possible for a user or the like to easily measure the rotation speed of a spherical moving body. An input unit receives diameter information about a spherical moving body. A measurement processing unit calculates the movement speed and rotation speed of the moving body on the basis of a Doppler signal and the diameter information. The measurement processing unit calculates the movement speed using the maximum peak value of a Doppler signal obtained continuously over a predetermined measurement time and calculates the rotation speed using the maximum frequency width value of the Doppler signal. A display unit shows display content that includes the calculated movement speed and rotation speed.

20 Claims, 13 Drawing Sheets

(56) References Cited

U.S. PATENT DOCUMENTS

| | | | |
|---|---|---|---|
| 6,244,971 B1 | 6/2001 | Mihran | |
| 8,845,442 B2 * | 9/2014 | Tuxen | A63B 69/3658 273/108.2 |
| 2002/0107078 A1 * | 8/2002 | Collins | A63B 69/3658 473/152 |
| 2005/0030222 A1 * | 2/2005 | Steudel | G01S 13/584 342/95 |
| 2009/0075744 A1 | 3/2009 | Tuxen | |
| 2011/0275462 A1 | 11/2011 | Saegusa et al. | |
| 2014/0320334 A1 | 10/2014 | Saegusa et al. | |

FOREIGN PATENT DOCUMENTS

| | | |
|---|---|---|
| JP | 2003-294777 | 10/2003 |
| JP | 2006-234485 | 9/2006 |
| JP | 2008-538085 | 10/2008 |
| JP | 2010-256068 | 11/2010 |
| JP | 2012-068139 | 4/2012 |
| JP | 2012-068163 | 4/2012 |
| JP | 2013-130569 | 7/2013 |
| WO | WO 2006/092141 | 9/2006 |
| WO | WO 2011/074247 | 6/2011 |
| WO | WO 2012/169179 | 12/2012 |
| WO | WO 2013/076979 | 5/2013 |
| WO | WO 2013/076980 | 5/2013 |

OTHER PUBLICATIONS

Merrill I. Skolnik, "Introduction to Radar Systems," second edition; McGraw-Hill Book Company; New York, NY, USA; copyright in the year 1980; ISBN 0-07-057909-1; Table 1.1 on p. 8, and section 12.9 on pp. 465-466. (Year: 1980).*

International Search Report for International Application No. PCT/JP2013/006674 dated Jan. 28, 2014, 4 pages, Japan.

* cited by examiner

FAR

NEAR

MOVING BODY ROTATION SPEED MEASUREMENT DEVICE

TECHNICAL FIELD

The present technology relates to a rotation speed measurement device that measures the rotation speed of spherical moving bodies.

BACKGROUND ART

The following are the three main methods known for measuring the rotation speed of spherical moving bodies: (1) take video of the spherical moving body, and calculate the rotation speed using image analysis technology (for example, see Japanese Unexamined Patent Application Publication No. 2006-234485A), (2) install an acceleration sensor within the spherical body, and measure the rotation speed from the periodicity of the acceleration data obtained (for example, see Japanese Unexamined Patent Application Publication No. 2010-256068A), and (3) the Doppler method of generating a radio wave for transmission from an antenna as a transmission wave, and calculating the movement speed of the moving body from the change in the frequency of the reflection wave from the moving body (for example, see Japanese Unexamined Patent Application Publication Nos. 2003-294777A and 2003-043141A, and US Patent No. 6244971B).

However, of the conventional technologies as described above, in the method of using image analysis technology described in (1), a camera or the like is used for taking the video, so a large-scale system is necessary, which has the problem that a large cost is involved. Also, in the method of (1), it is difficult to measure the rotation speed automatically, for example there is the problem that it is difficult for a user to measure the rotation speed of their own pitching.

Also, in the method of installing an acceleration sensor within the spherical body as described in (2) above, it is difficult to make the properties and performance of the spherical body the same as a normal spherical body, so there is the problem that the field of application is limited. Also, in the Doppler method described in (3) above, normally the radio wave transmission equipment and receiving equipment are separate, which has the problem that it is difficult to carry out stable measurement. Also, in the method described in (3) above, there is the problem that it is difficult to reduce the size of the measurement equipment.

SUMMARY

The present technology provides a moving body rotation speed measurement device that enables a user or the like to easily measure the rotation speed of a moving spherical body.

A moving body rotation speed measurement device according to the present technology includes: an antenna having directivity, that transmits a transmission wave to a spherical moving body based on a supplied transmission signal, and receives a reflection wave reflected at the moving body and generates a received signal; a Doppler sensor that supplies the transmission signal to the antenna, and generates a Doppler signal having a Doppler frequency based on the received signal; an input unit to which diameter information of the spherical body is input; a measurement processing unit that calculates the movement speed and the rotation speed of the moving body based on the Doppler signal and the diameter information; a display unit that displays display contents including the calculated movement speed and rotation speed; and a casing that retains at least the display unit.

According to the present embodiment, the rotation speed and the movement speed of the moving body can be measured in a comparatively low frequency region using the Doppler signal, so the rotation speed and the movement speed of the moving body can be measured with a simple configuration.

DETAILED DESCRIPTION

Embodiment

Figure 1:
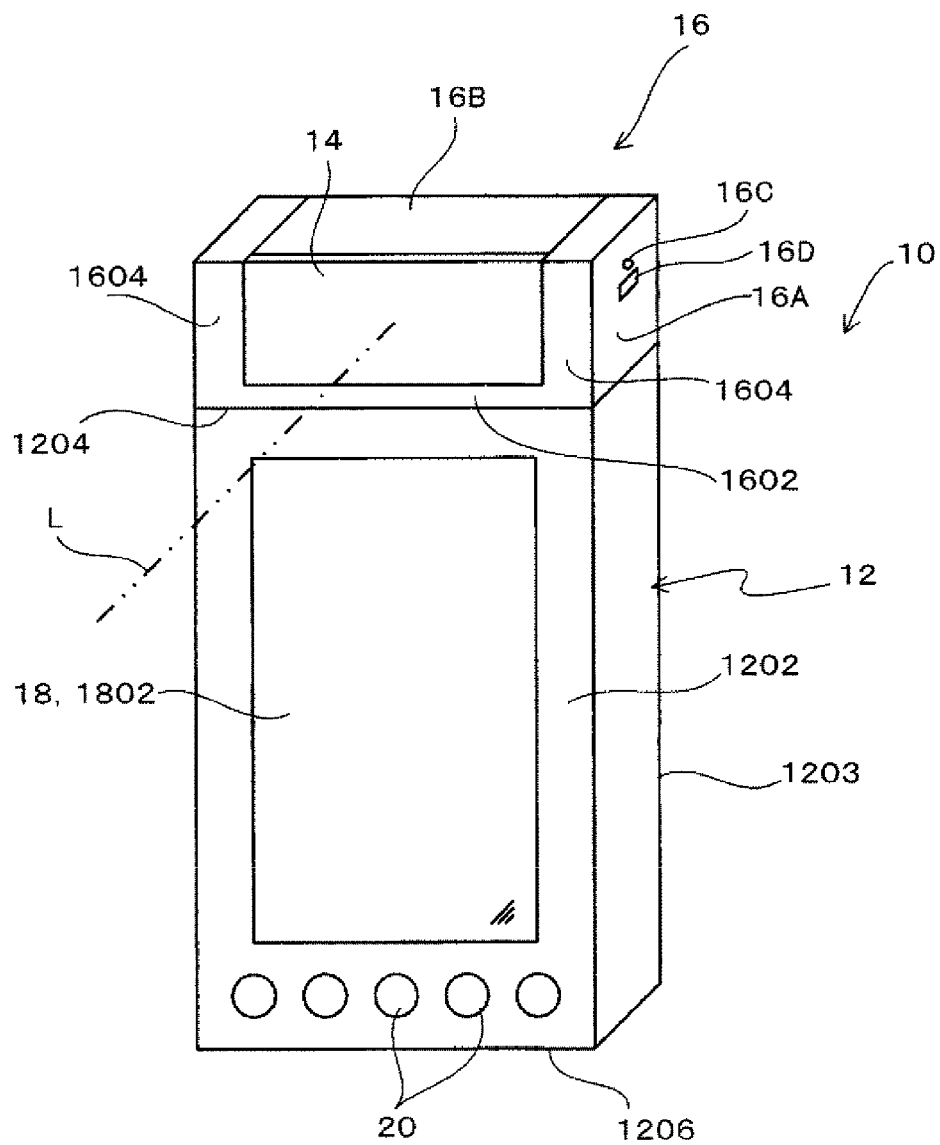
FIG. 1 is a perspective view illustrating the appearance of a rotation speed measurement device 10 according to an embodiment.

Next, embodiments of the present technology will be described while referring to the drawings.

Figure 2:
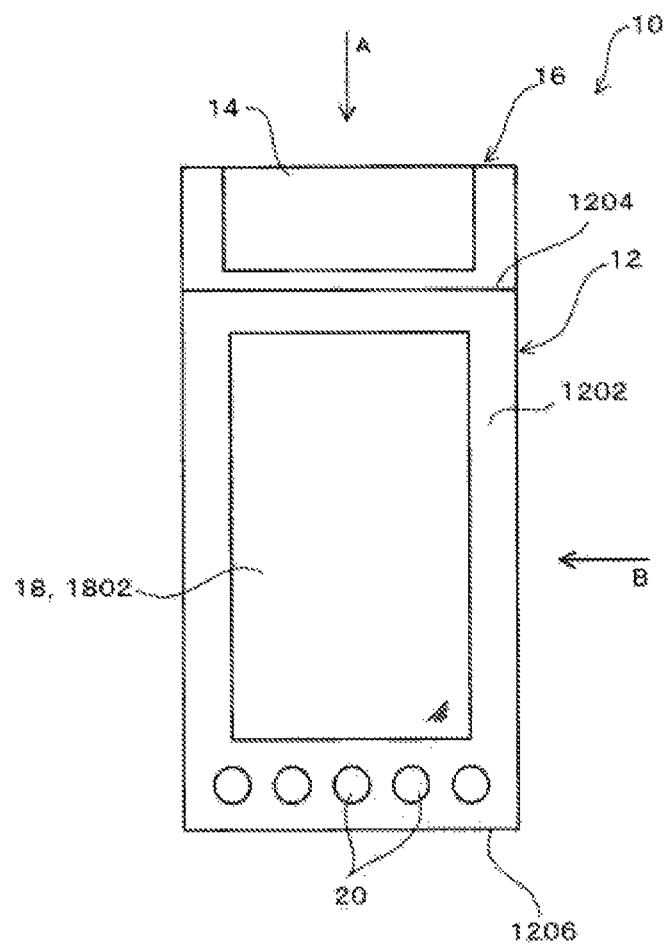
FIG. 2 is a front view of the rotation speed measurement device 10.

FIG. 1 is a perspective view illustrating the appearance of a rotation speed measurement device 10 according to an embodiment, and FIG. 2 is a front view of the rotation speed measurement device 10.

As illustrated in FIG. 1, the moving body rotation speed measurement device 10 (hereinafter, simply referred to as rotation speed measurement device 10) is configured to include a casing 12, an antenna 14, an antenna support 16, a display unit 18, and an input unit 20.

The casing 12 has a rectangular plate shape having a thickness in the vertical direction, a width in the lateral direction with a dimension greater than that of the thickness, and a length in the forward-rear direction with a dimension greater than that of the width.

A top surface 1202 of the casing 12 has a rectangular shape with the longitudinal direction thereof parallel to the forward-rear direction of the casing 12.

A front surface 1204 and a rear surface 1206 of the casing 12 are connected to the front and rear respectively of the top surface 1202.

Also, a female screw (camera screw) that is not illustrated on the drawings is provided on a bottom surface 1203 opposite to the top surface 1202, in order to attach the rotation speed measurement device 10 to a fixing device such as a tripod or the like.

The antenna 14 is connected to the top surface 1202 of the casing 12 via the antenna support 16.

The antenna 14 has directivity, transmits a transmission wave toward the moving body based on a transmission signal supplied from a Doppler sensor 22 (see FIG. 7) that is described later, and receives a reflection wave reflected by the moving body, generates a received signal, and supplies the received signal to the Doppler sensor 22.

In this Specification, an imaginary line extending along the direction in which the gain of the antenna 14 is a maximum is the imaginary axis L indicating the directivity direction of the antenna.

In the present embodiment, the antenna 14 is configured from a rectangular plate shaped patch antenna, one surface in the thickness direction thereof is the top surface that transmits the transmission wave and receives the reflected wave, and the opposite side to the top surface is the rear surface.

Also, a patch antenna is used as the antenna 14, which is advantageous in terms of size reduction of the rotation speed measurement device 10. However, various types of commonly known antenna such as a horn antenna can be used as the antenna 14.

Note that if the directivity angle of the antenna 14 is too narrow, there will be the disadvantage that the measurement range of the moving body will be restricted, and if the directivity angle of the antenna 14 is too broad, unwanted reflected waves will be received from bodies other than the moving body that is to be measured, and this will be disadvantageous in terms of ensuring measurement accuracy.

Therefore, a directivity angle of the antenna 14 in the range 5 to 90 degrees is advantageous in terms of minimizing the receipt of unwanted reflected waves from bodies other than the target object, while maintaining the measurement range of the moving body.

The antenna support 16 is provided on the casing 12, and supports the antenna 14 so that the inclination of the imaginary axis L can be changed.

In the present embodiment, the antenna support 16 includes a frame 16A and a case 16B.

The frame 16A is configured from a base section 1602 provided on the front surface 1204 of the casing 12 extending in the width direction of the casing 12, and two pillar sections 1604 that stand up to the front from the two ends of the base section 1602.

The case 16B has a rectangular plate shape that is slightly smaller than the contour of the antenna 14 in plan view, and is attached to the back surface of the antenna 14 with four edges of the case 16B parallel to four edges of the antenna 14.

In more detail, the case 16B includes a rectangular plate shaped bottom wall opposite the antenna 14, and four side walls that rise from the bottom wall, and the tops of the four side walls are connected to the back surface of the antenna 14. Also, the space enclosed by the bottom wall, the four side walls, and the antenna 14 houses the Doppler sensor 22 that is described later.

In addition, an integrated module in which the antenna 14 and the Doppler sensor 22 are integrally provided may also be used. In this case, the Doppler sensor 22 may be integrally provided on the back surface of the antenna 14.

Using such an integrated module is advantageous in terms of reducing noise added to the signal by reducing the length of the signal path between the antenna 14 and the Doppler sensor 22. Also, it is advantageous in terms of size reduction of the rotation speed measurement device 10.

Note that the Doppler sensor 22 may be housed in the casing 12.

Two opposing side walls of the four side walls of the case 16B are disposed between the two pillar sections 1604, and are rotatably supported by the two pillar sections 1604 via a support shaft 16C oriented in the axial center in the lateral direction of the casing 12.

Therefore, the antenna support 16 supports the antenna 14 so that the inclination of the imaginary axis L can be changed.

Figure 4:
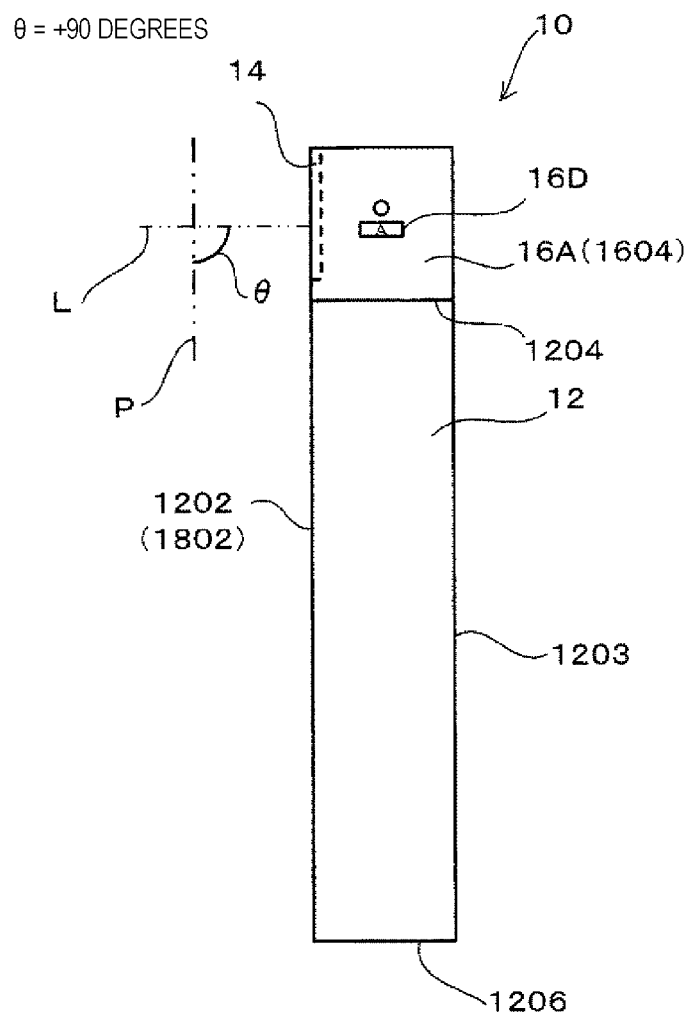
FIG. 4 is a view along arrow B in FIG. 2.

In the present embodiment, the angle that the imaginary axis L makes with an imaginary plane P that is parallel with a display surface 1802 of the display unit 18 is referred to as the antenna angle θ, as illustrated in FIG. 4. In the present embodiment, the antenna support 16 supports the antenna 14 so that the antenna angle θ can be changed in the range ±90 degrees. In other words, the antenna angle θ changes through a range of 180 degrees. Note that the range of adjustment of the antenna angle θ is not limited to 180 degrees, and the adjustment range may be set as desired.

Figure 3:
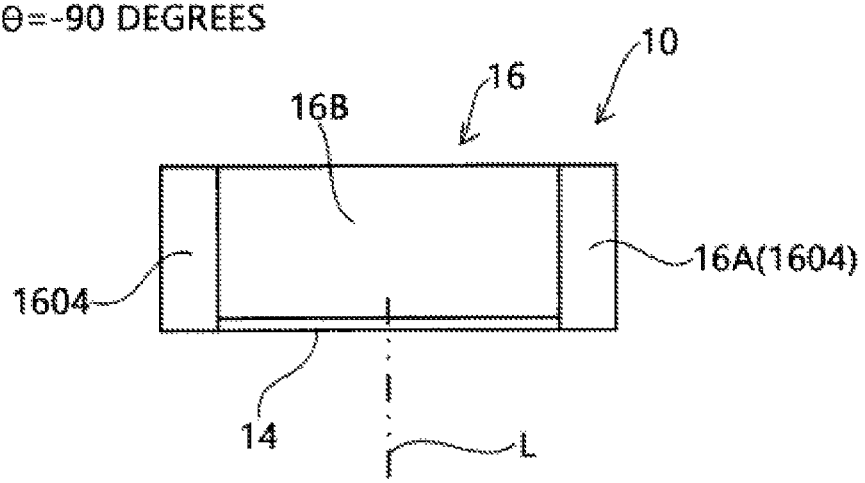
FIG. 3 is a view along arrow A in FIG. 2.
Figure 5:
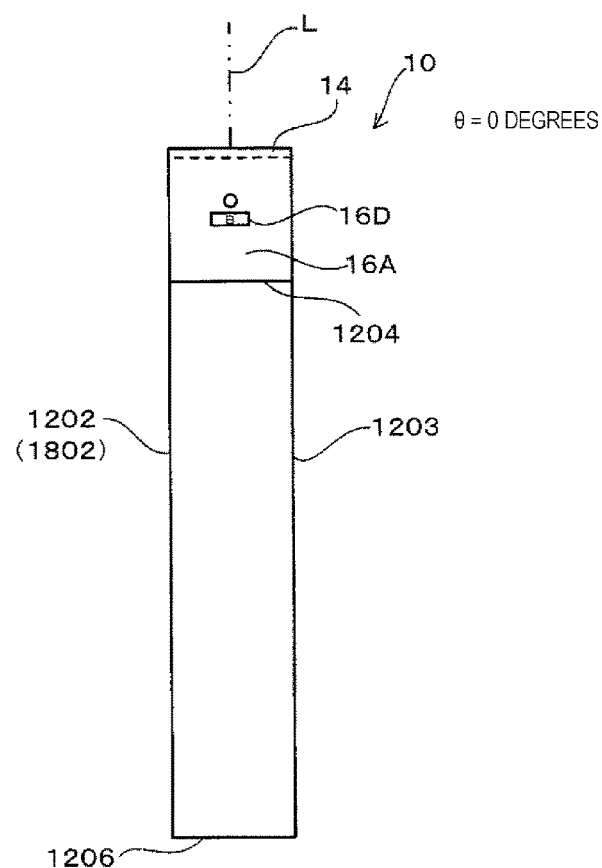
FIG. 5 is a view illustrating the antenna in FIG. 4 rotated through 90 degrees.

Here, the imaginary axis L oriented in the upward direction of the casing 12 as illustrated in FIG. 4 has an antenna angle θ=+90 degrees, the imaginary axis L oriented in the forward direction of the casing 12 as illustrated in FIG. 5 has an antenna angle θ=0 degrees, and the imaginary axis L oriented in the downward direction of the casing 12 as illustrated in FIG. 3 has an antenna angle θ=−90 degrees. Therefore, the range of adjustment of the antenna angle θ is ±90 degrees. Note that in the present embodiment, a case has been described in which the antenna support 16 rotationally supports the antenna 14 about the support shaft 16C, but various conventional commonly known mechanisms can be used as the antenna support 16 provided the antenna support 16 can support the antenna 14 so that the inclination of the imaginary axis L can be changed.

For example, a configuration in which another support shaft is further provided extending in a plane orthogonal to the support shaft 16C, and the antenna support 16 supports the antenna 14 so that it can rotate about the two support shafts may be used. This case is advantageous in terms of ensuring the degree of freedom of adjustment of the inclination of the imaginary axis L of the antenna 14.

Also, in the present embodiment, the antenna support 16 may have a click mechanism that holds the antenna 14 in a plurality of predetermined antenna angles θ, for example the three angles +90 degrees, 0 degrees, and −90 degrees. In this way, the operation of setting in the plurality of predetermined antenna angles θ can be simplified.

In addition, in the present embodiment, an angle display unit 16D is provided in the antenna support 16 that indicates which of the predetermined plurality of antenna angles θ the antenna 14 is positioned in. In this way, the antenna angle θ can be easily confirmed.

The angle display unit 16D is configured from a window provided in one of the pillar sections 1604, and an indicator provided at a position on the case 16B.

The indicator is formed by symbols, such as A, B, and C, numerals, graduation lines, or the like provided at locations on the case 16B corresponding to antenna angles θ of +90 degrees, 0 degrees, and −90 degrees.

When the antenna angle θ of the antenna 14 is switched to either of +90 degrees, 0 degrees, and −90 degrees, the indicators A, B, and C formed at locations on the case 16B are selectively exposed through the window, indicating which of the plurality of antenna angles θ the antenna 14 is positioned in.

Note that a conventional commonly known display mechanism can be used as the angle display unit 16D.

The display unit 18 includes a rectangular plane display surface 1802 provided on the top surface 1202 of the casing 12 that is oriented upwards, and the display surface 1802 occupies the majority of the top surface 1202.

In the present embodiment, the display surface 1802 has a rectangular shape with the length in the forward-rear direction of the casing 12 longer than the width along the lateral direction of the casing 12.

The display unit 18 displays the measurement results, namely the various display contents including the movement speed and rotation speed of the moving body on the display surface 1802 in the form of numerals, symbols, icons, or the like.

A flat panel display such as a liquid crystal panel can be used as the display unit 18.

The input unit 20 is provided in a position near the rear surface 1206 side of the top surface 1202.

In the present embodiment, the input unit 20 is configured from a plurality of operation buttons including a mode selection button, and a power supply button. Note that the display unit 18 as described above may be a touch panel display with the display unit 18 also functioning as the input unit 20.

The power supply button is for turning the power supply on and off.

The mode selection button is a button for selecting the measurement mode of the rotation speed measurement device 10. In the present embodiment, any of a golf mode, a batting mode, and a ball mode can be selected as the measurement mode of the rotation speed measurement device 10. The golf mode is a mode that measures a golf ball striking speed by a golf club. The batting mode is a mode that measures the ball striking speed of a baseball ball 6 by a baseball bat. The ball mode is a mode that measures the pitching speed of a baseball ball 6 by a pitcher.

Figure 6:
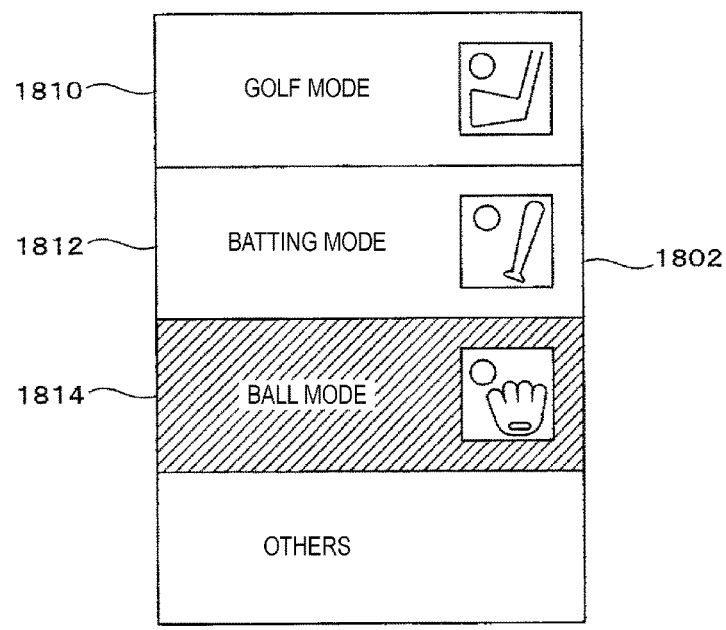
FIG. 6 is an explanatory view illustrating one example of a measurement mode selection screen.

FIG. 6 is an explanatory view illustrating one example of a measurement mode selection screen. FIG. 6 illustrates a golf mode selection section 1810, a batting mode selection section 1812, and a ball mode selection section 1814 displayed on the display surface 1802 of the rotation speed measurement device 10 as measurement modes. In FIG. 6, the ball mode selection section 1814 is selected, and is displayed in a color that is different from the other selection sections. The measurement mode can be set by the user selecting and confirming any of the selection sections.

Note that various conventional commonly known display formats can be used as the measurement mode selection screen. Also, selecting the measurement mode is not necessarily accompanied by a display, and various conventional commonly known formats can be used.

By carrying out the mode selection in this way, the diameter information necessary for calculating the rotation speed of the spherical body as described later is input. In other words, when the spherical moving body is a ball for a ball game, the type of ball for a ball game is input to the input unit 20. A database that records the diameter or the radius for each type of ball for a ball game is provided in a calculating unit 30 that is described later, so if the type of ball for a ball game is specified, the diameter of the spherical body can be specified.

Also, the value of the diameter of the spherical body that is to be the moving body may be directly input to the input unit 20, without carrying out this type of mode selection.

In the following, a description is provided for a case in which the measurement mode is selected to be the ball mode, and the movement speed and the rotation speed of a baseball ball 6 thrown by a user is measured as the moving body.

Note that there is no particular limitation on the attitude of the casing 12 when using the rotation speed measurement device 10, but normally it is either (1) an attitude in which the top surface 1202 (display surface 1802) of the casing 12 is facing upwards, or (2) an attitude in which the front surface 1204 of the casing 12 is facing upwards and the top surface 1202 (display surface 1802) is facing sideways, and the antenna angle θ is adjusted so that the imaginary axis L of the antenna 14 coincides with the movement direction of the moving body.

Also, the rotation speed measurement device 10 may include a battery, which is not illustrated on the drawings, that stores electrical power, and the rotation speed measurement device 10 is driven using the electrical power stored in the battery. In this way, the rotation speed measurement device 10 can be installed near the user, without obstructing the ball pitching or the like.

Figure 7:
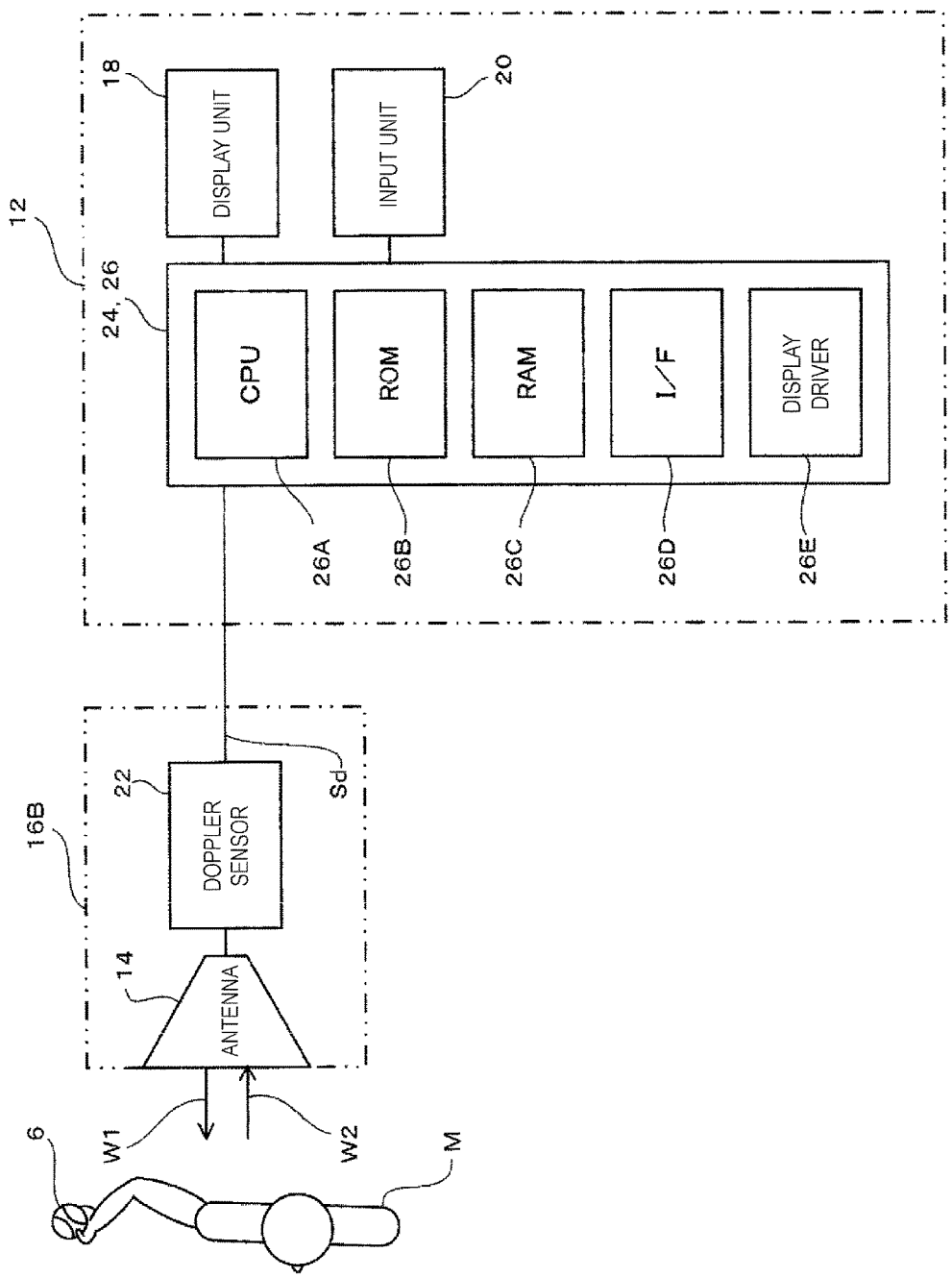
FIG. 7 is a block diagram illustrating the configuration of the rotation speed measurement device 10.

Next, the configuration of the control system of the rotation speed measurement device 10 is described with reference to FIG. 7. FIG. 7 is a block diagram illustrating the configuration of the rotation speed measurement device 10.

Note that in FIG. 7, reference sign 6 indicates a baseball ball as a spherical moving body, and reference sign M indicates a user pitching the baseball ball 6.

The rotation speed measurement device 10 is configured to include the Doppler sensor 22, a measurement processing unit 24, and the like, in addition to the antenna 14, the display unit 18, and the input unit 20.

The Doppler sensor 22 is connected to the antenna 14 via a cable that is not illustrated on the drawings, supplies the transmission signal to the antenna 14, receives the received signal supplied from the antenna 14 via the cable, and detects a Doppler signal Sd.

The Doppler signal is a signal having a Doppler frequency Fd defined by a frequency F1-F2, which is the difference between the frequency F1 of the transmission signal and the frequency F2 of the received signal.

Various commercially available sensors can be used as a Doppler sensor 22.

Note that a microwave of 24 GHz or 10 GHz, for example, can be used as the transmission signal, but the frequency of the transmission signal is not limited provided the Doppler signal Sd can be obtained. In this way, the versatility of the rotation speed measurement device 10 can be increased. Also, the transmission wave output is, for example, not more than 10 mW. This is because when the rotation speed measurement device 10 is driven by a battery, the length of time that it can be used can be increased, so it is desirable that the power consumption be reduced as much as possible. In the rotation speed measurement device 10, the electrical power consumed in transmitting the transmission wave from the antenna 14 is very large. By making the transmission wave output not more than 10 mW, the electrical power consumption can be reduced, and the duration that the rotation speed measurement device 10 can be used when driven by battery can be increased.

Here, the principle of measurement of the movement speed of the moving body using the Doppler sensor 22 is described.

As known conventionally, the Doppler frequency Fd is expressed by Formula (1).

$$Fd=F-F2=2\cdot V\cdot F1/c \qquad (1)$$

Where V is the movement speed of the moving body, and c is the speed of light ($3\times10^8$ m/s). Therefore, solving for V gives equation (2).

$$V=c\cdot Fd/(2\cdot F1) \qquad (2)$$

In other words, the movement speed V of the moving body is proportional to the Doppler frequency Fd.

Thus, the Doppler frequency Fd can be measured from the Doppler signal Sd and the movement speed V can be calculated from the Doppler frequency Fd.

Next, measurement of the rotation speed of moving body is specifically described.

Figure 8:
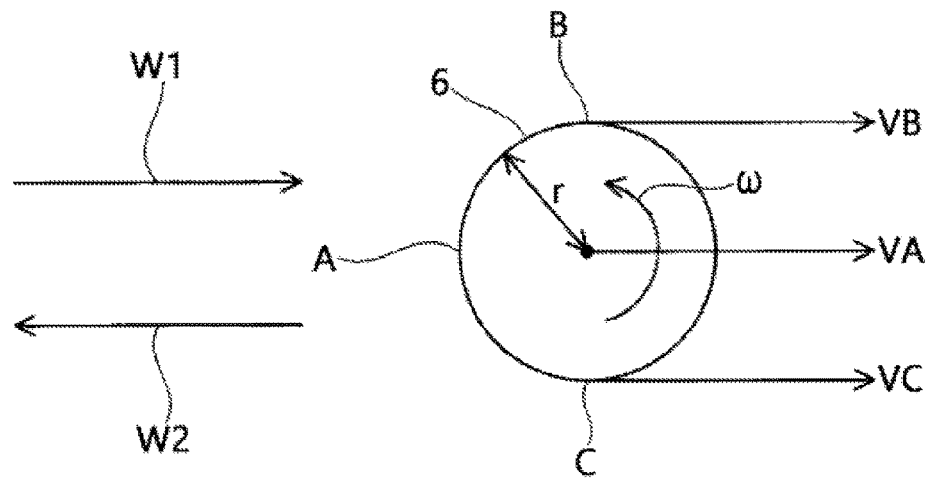
FIG. 8 is an explanatory view of the principle for measuring the rotation speed of a moving body (baseball ball 6).

FIG. 8 is an explanatory view of the principle for detecting the rotation speed of the moving body (baseball ball 6).

The transmission wave W1 reflects efficiently at a first portion A of the surface of the moving body, which is a portion of the surface where the angle formed with the transmission direction of the transmission wave W1 is close to 90 degrees (about 90 degrees). Thus, the intensity of the reflection wave W2 at the first portion A is high.

On the other hand, the transmission wave W1 does not reflect efficiently at a second portion B and a third portion C of the surface of the moving body, which are portions of the surface where the angle formed with the transmission direction of the transmission wave W1 is close to 0 degrees (about 0 degrees). Thus, the intensity of the reflection wave W2 at the second portion B and the third portion C is low.

The second portion B is a portion where the direction of movement due to rotation of the moving body is in the opposite direction to the direction of movement of the moving body.

The third portion C is a portion where the direction of movement due to rotation of the moving body is in the same direction as the direction of movement of the moving body.

When a first velocity VA is a velocity detected based on the reflection wave W2 reflected at the first portion A, a second velocity VB is a velocity detected based on the reflection wave W2 reflected at the second portion B, and a third velocity VC is a velocity detected based on the reflection wave W2 reflected at the third portion C,
the following equations are established:

$$VA = V \qquad (4)$$

$$VB = VA - \omega r \qquad (5)$$

$$VC = VA + \omega r \qquad (6)$$

where, V is the movement speed of the moving body, $\omega$ is the angular velocity (rad/s), and r is the radius of the moving body.

Thus, if the first, second, and third velocities VA, VB, and VC can be measured, the movement speed V of the moving body can be calculated from the first velocity VA based on equation (4). Additionally, since the angular velocity $\omega$ can be calculated from the second and third velocities VB and VC based on equations (5) and (6), the rotation speed can be calculated from the angular velocity $\omega$. Note that as shown in equations (5) and (6) above, the value of the radius of the moving body is used in calculating the rotation speed, so the diameter or radius information is input from the input unit 20.

Namely, a speed and rotation speed calculation unit 30B that is described later calculates each of the speeds using the reflection wave from the first portion A, which is that portion of the surface of the spherical moving body that makes an angle of about 90 degrees with the transmission direction of the transmission wave, the second portion B that makes an angle of about 0 degrees with the transmission direction of the transmission wave and at which the rotation direction of the spherical body is in the opposite direction to the movement direction of the moving body, and the third portion 3 that makes an angle of about 0 degrees with the transmission direction of the transmission wave and at which the rotation direction of the spherical body is in the same direction as the movement direction of the moving body. The first speed VA calculated using the reflection wave W2 from the first portion A indicates the movement speed V of the spherical body. The second speed VB calculated using the reflection wave W2 from the second portion B indicates the first speed VA from which the value of the product of the angular velocity $\omega$ and the radius r of the spherical body has been deducted. The third speed VC calculated using the reflection wave W2 from the third portion C indicates the first speed VA to which the value of the product of the angular velocity $\omega$ and the radius r of the spherical body has been added. Therefore, the rotation speed of the spherical body is calculated by calculating the angular velocity $\omega$ from the first speed VA, the second speed VB, and the third speed VC.

Next, the measurement of the first, second, and third velocities VA, VB, and VC is described.

Figure 9:
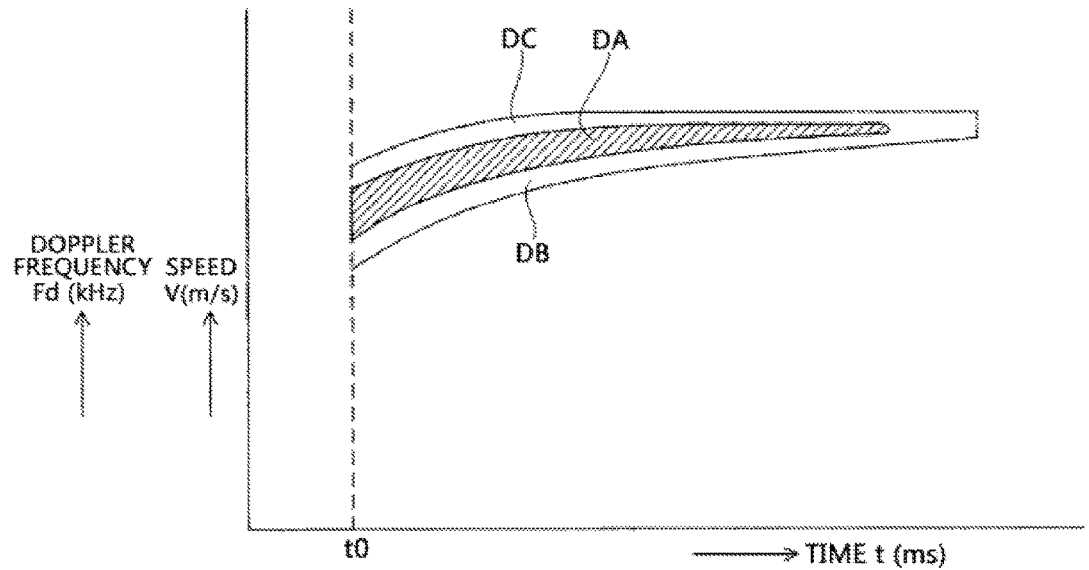
FIG. 9 is a graph showing the results of wavelet analysis of the Doppler signal Sd.

FIG. 9 shows the results of wavelet analysis of a Doppler signal Sd in the case of measurement using the rotation speed measurement device 10 of the moving body launched with a special device.

Time t (ms) is shown on the horizontal axis and the Doppler frequency Fd (kHz) and the movement speed V (m/s) of the moving body are shown on the vertical axis. Also, the time t0 on the horizontal axis indicates the time that the moving body is launched.

Such a diagram is obtained by, for example, sampling the Doppler signal Sd, taking in the signal to a digital oscilloscope, converting the signal into digital data, and carrying out wavelet analysis or FFT analysis on the digital data using a personal computer or the like.

In the frequency distribution illustrated in FIG. 9, an intensity of the Doppler signal Sd is high in the portion illustrated using cross-hatching, and the intensity of the Doppler signal Sd in the portion illustrated using solid lines is lower than that of the portion illustrated using the cross-hatching.

Thus, signal intensity of the frequency distribution at the area labeled DA, a portion corresponding to the first velocity VA, is high.

Signal intensity of the frequency distribution at the area labeled DB, a portion corresponding to the second velocity VB, is low.

Signal intensity of the frequency distribution at the area labeled DC, a portion corresponding to the third velocity VB, is low.

Thus, by performing an analysis of the intensity of the Doppler signal Sd based on frequency, the frequency distributions DA, DB, and DC are identified, and the first, second, and third velocities VA, VB, and VC can be obtained from the frequency distributions DA, DB, and DC, respectively, as time series data by using the principles of the Formulas (4), (5), and (6) described above.

In other words, the speed and rotation speed calculation unit 30B that is described later calculates the rotation speed of the spherical body from the Doppler signal Sd signal intensity distribution data, with the comparatively high signal intensity component as the reflected wave component from the first portion A, with the component of the comparatively low signal intensity component with a frequency lower than the reflected wave component from the first portion A as the reflected wave component from the second portion B, and with the component of the comparatively low signal intensity component with a frequency higher than the reflected wave component from the first portion A as the reflected wave component from the third portion C.

Such processing is possible using conventionally known various signal processing circuits, or, alternatively, a microprocessor that operates based on a signal processing program.

Here, the change in the movement speed of the moving body in FIG. 9 (the increase in the speed immediately after launching) is described. In FIG. 9, immediately after launching the moving body (near the time t0), the movement speed of the moving body increases with time, eventually becoming a constant movement speed. This is an error caused by the angle between the transmission wave transmitted from the antenna 14 and the position of the moving body.

In more detail, the movement speed of the moving body calculated from equation (2) above is the component of the movement velocity in the direction coinciding with the imaginary axis L indicating the directivity of the antenna 14. Therefore, as the trajectory of movement of the moving body deviates from the imaginary axis L indicating the directivity of the antenna 14, the error in the movement speed of the moving body obtained from equation (2) tends to increase.

Figure 10A:
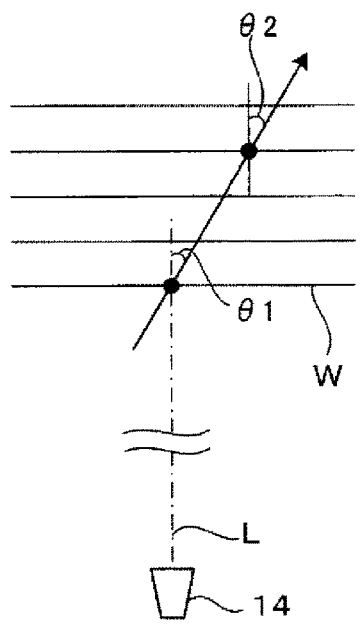
FIGS. 10A and 10B are explanatory views illustrating the positional relationship between the wave front of the transmission wave transmitted from the antenna 14 and the movement direction of the moving body.
Figure 10B:
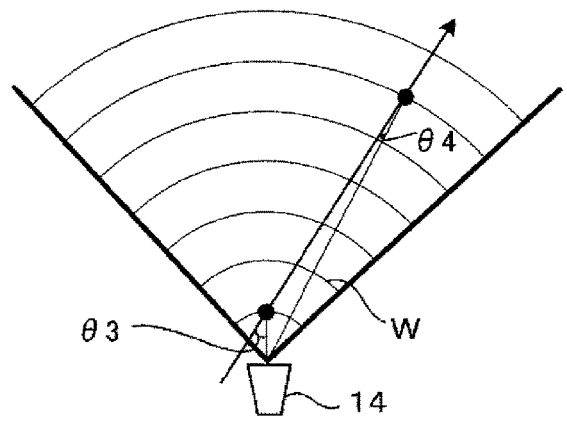

FIGS. 10A and 10B is an explanatory view illustrating the positional relationship between the wave front of the transmission wave transmitted from the antenna 14 and the movement direction of the moving body.

As illustrated in FIG. 10A, the movement speed of the moving body having an angle $\theta$ with respect to the imaginary axis L indicating the directivity of the antenna 14 is measured slower than the actual movement speed by $\cos\theta$.

Here, as indicated in FIG. 10A, if the moving body is sufficiently far from the antenna 14, the transmission wave is generally a plane wave (or in more detail, a plane wave having a wave front W orthogonal to the imaginary axis L). In other words, the normal line direction of the wave front W of the transmission wave transmitted from the antenna 14 is always coincident with the imaginary axis L. Therefore, the angle $\theta$ between the direction of movement of the moving body that is moving in a constant direction and the normal line direction of the wave front W is always constant (in FIG. 10A, $\theta 1=\theta 2$). As a result, the error (delay) in the movement speed of the moving body is always constant.

On the other hand, as illustrated in FIG. 10B, when the moving body is positioned near the antenna 14, the transmission wave is a spherical wave (in more detail, a spherical wave with the position of the antenna 14 as center). In other words, the normal line direction of the wave front W of the transmission wave transmitted from the antenna 14 varies depending on the position. Therefore, the angle $\theta$ between the direction of movement of the moving body that is moving in a constant direction and the normal line direction of the wave front W varies depending on position (in FIG. 10B, $\theta 3 \neq \theta 4$). As a result, the movement speed of the moving body is measured with an error (delay) that varies depending on the position of the moving body.

As illustrated in FIG. 10A, when the moving body and the antenna 14 are sufficiently distant, and the angular error can be sufficiently ignored, or when the positional relationship between the moving body and the antenna 14 is fixed, an average value of the movement speed within the measurement duration or the like can easily be measured. On the other hand, as illustrated in FIG. 10B, when the moving body passes near the antenna 14, the change in frequency with time due to the angular error cannot be ignored.

In order to avoid this measurement error in the speed based on the angular error in this way, for example one method is to carry out measurement after sufficient time has passed (after the positional relationship of FIG. 10A has been established) from the movement start time of the moving body (t0 in FIG. 9). However, the frequency distribution DB corresponding to the second velocity VB and the frequency distribution DC corresponding to the third velocity VC reduce with the passage of time, in other words as the distance between the moving body and the antenna 14 increases, as illustrated in FIG. 9, so there is the problem that the rotation speed cannot be measured.

Also in cases such as when a user measures their own pitching speed and rotation speed, it is necessary for the user to operate the rotation speed measurement device 10, so it is not possible to increase the distance between the moving body movement start position (the position of the user) and the antenna 14 installation position (rotation speed measurement device 10 installation position).

As means for solving this problem, in the rotation speed measurement device 10, measurement of the Doppler signal is carried out after a predetermined duration from start of movement of the moving body. In other words, the antenna 14 transmits the transmission wave and receives the reflection wave continuously during a predetermined measurement duration, and the Doppler sensor 22 supplies the transmission signal and generates the Doppler signal continuously during the predetermined measurement duration.

Then, from the Doppler signal obtained in the predetermined time, the movement speed of the moving body is calculated using the peak value of the frequency, and the rotation speed of the moving body is calculated using the maximum value of the amplitude. In other words, the calculation unit 30 (see FIG. 11) that is described later calculates the movement speed using the maximum value of the peak value from the Doppler signal obtained continuously during the predetermined measurement duration, and calculates the rotation speed using the maximum value of the width.

In this way, even when the moving body passes close to the antenna 14 and there is a possibility that the angular error will be produced with the normal measurement method, the movement speed and rotation speed of the moving body can be stably measured.

Returning to FIG. 7, the description is continued.

The measurement processing unit 24 calculates the movement speed and the rotation speed of the moving body (in the present embodiment, the baseball ball 6) by inputting the Doppler signal Sd supplied from the Doppler sensor 22 and performing a calculation process.

In the present embodiment, the measurement processing unit 24 is configured from a microcomputer 26.

The microcomputer 26 includes a CPU 26A, a ROM 26B connected via an interface circuit and bus line that are not illustrated on the drawing, a RAM 26C, an interface 26D, a display driver 26E, and the like.

The ROM 26B stores a control program for calculating the movement speed and rotation speed of the moving body that is executed by the CPU 26A, and the RAM 26C provides a working area.

The Doppler signal Sd is input to the interface 26D and supplied to the CPU 26A, and, the interface 26D receives operation signals from the input unit 20 and supplies them to the CPU 26A.

The display driver 26E drives the display unit 18 based on the control of the CPU 26A.

Figure 11:
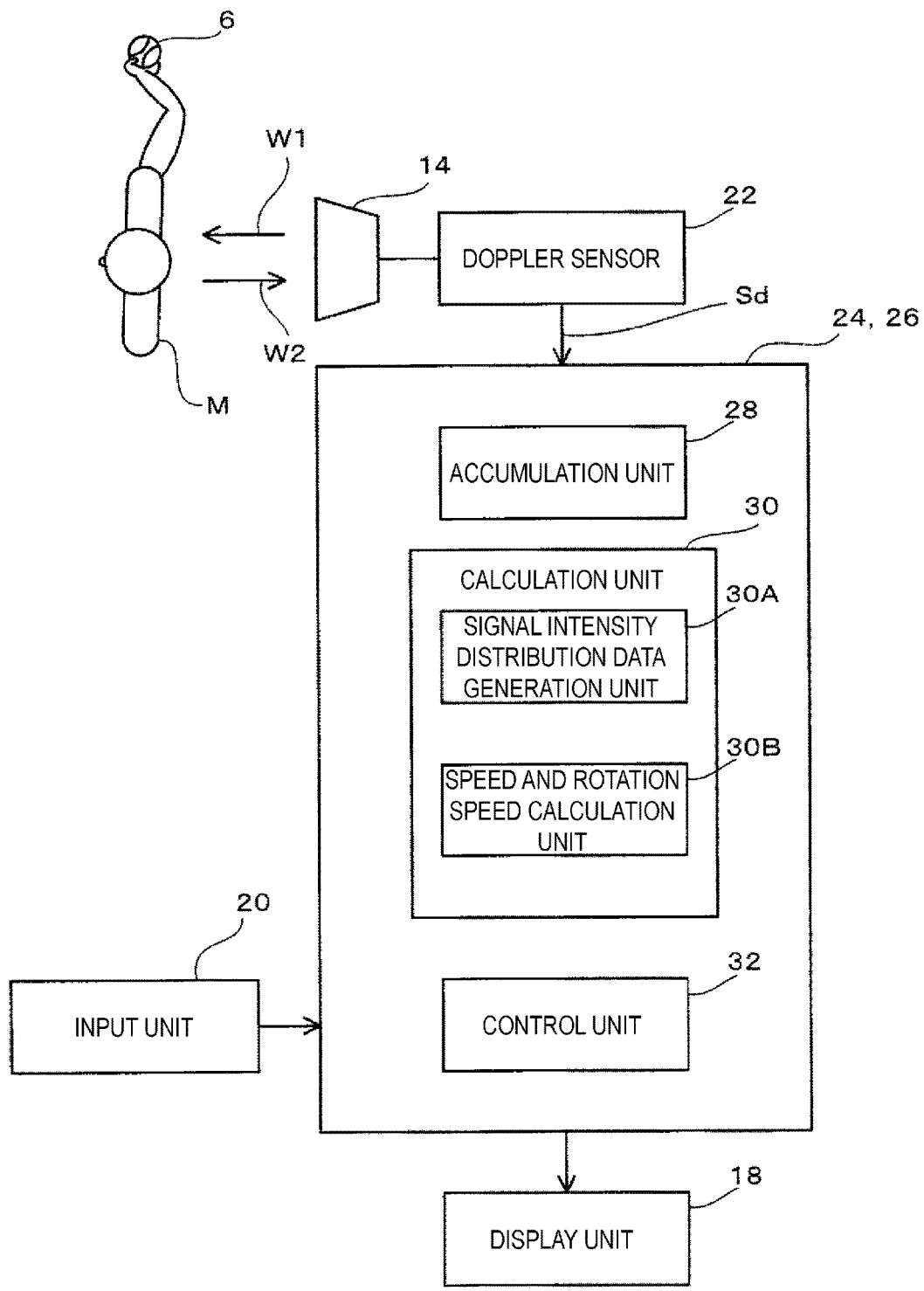
FIG. 11 is a functional block diagram of the rotation speed measurement device 10.

FIG. 11 is a block diagram of the rotation speed measurement device 10 illustrating a functional block from which the microcomputer 26 is configured.

The microcomputer 26 is functionally configured to include an accumulation unit 28, a calculation unit 30, and a control unit 32.

Also, the accumulation unit 28, the calculation unit 30, and the control unit 32 are realized by the CPU 26A executing the control program, but these parts may be configured from hardware such as a circuit.

The accumulation unit 28 accumulates the Doppler signal Sd in sequence in accordance with the elapsed time at a predetermined sampling interval.

In the present embodiment, the CPU 26A samples the Doppler signal Sd at the sampling interval and stores the Doppler signal Sd in the RAM 26C as sample data.

For example, the accumulation unit 28 starts the sampling operation at the same time that the power supply of the rotation speed measurement device 10 is turned on.

Figure 12:
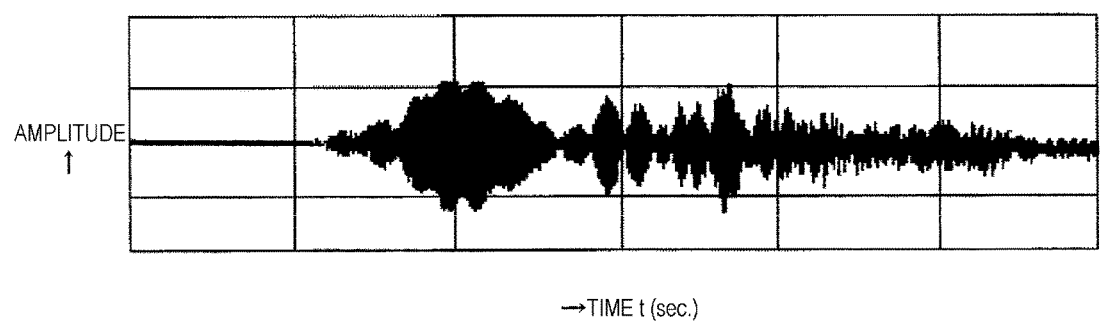
FIG. 12 is a graph showing one example of a Doppler signal Sd when the baseball ball 6 is pitched.

FIG. 12 is a graph showing one example of the Doppler signal Sd when the baseball ball 6 is thrown. The horizontal axis is time t (sec.), and the vertical axis is amplitude (discretionary unit).

In FIG. 12, the waveform part with a large amplitude at the beginning is the part of the Doppler signal produced by the movement of the user, and the subsequent waveform parts are the parts of the Doppler signal produced by the pitched baseball ball 6.

Returning to FIG. 11, the calculation unit 30 calculates the movement speed and rotation speed of the moving body based on the Doppler signal and the diameter information for the moving body. The calculation unit 30 is configured from a signal intensity distribution data generation unit 30A, and a speed and rotation speed calculation unit 30B.

The signal intensity distribution data generation unit 30A generates signal intensity distribution data by performing frequency analysis (continuous FFT analysis, or, wavelet analysis) of the sample data of the Doppler signal Sd accumulated in the accumulation unit 28.

In other words, the signal intensity distribution data generation unit 30A generates signal intensity distribution data that indicates the distribution of the signal intensity for each frequency by performing frequency analysis of the Doppler signal Sd obtained from the Doppler sensor 22.

In the present embodiment, the signal intensity distribution data generation unit 30A generates the signal intensity distribution data for the sample data of the Doppler signal Sd for a specified predetermined section of the time series data accumulated in the accumulation unit 28. In other words, the signal intensity distribution data generation unit 30A converts the Doppler signal into signal intensity distribution data in each time interval (sampling interval period) during the predetermined measurement duration. The section of the sample data of the Doppler signal Sd is specified based on the predetermined measurement time.

In other words, the signal intensity distribution data generation unit 30A identifies the sample data in a specific section of the sample data of the Doppler signal Sd that has been uninterruptedly accumulated after the baseball ball 6 has been pitched, and generates the signal intensity distribution data.

Figure 13A:
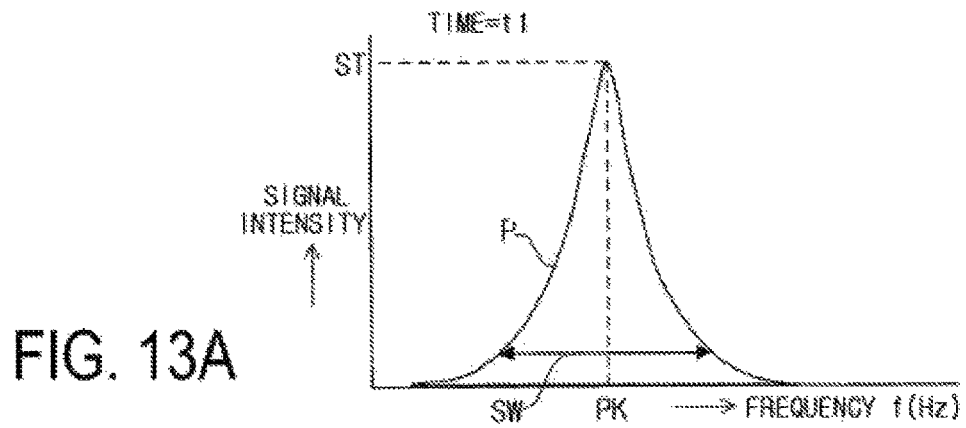
FIGS. 13A to 13D are graphs showing an example of signal intensity distribution data P.
Figure 13B:
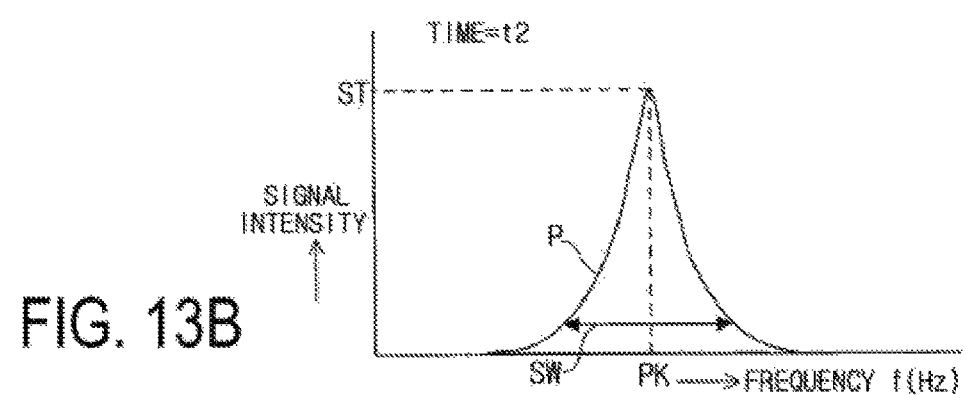
Figure 13C:
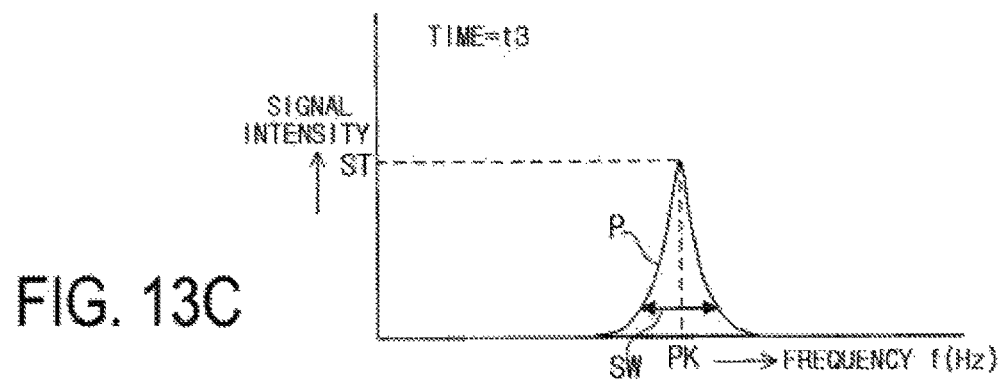
Figure 13D:
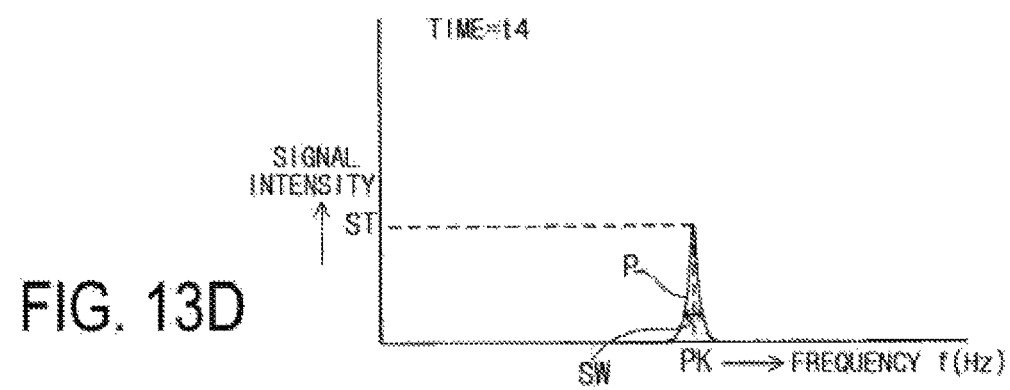

FIGS. 13A to 13D are graphs showing an example of the signal intensity distribution data P generated by the signal intensity distribution data generation unit 30A. FIG. 13A shows the signal intensity distribution data at time t1, FIG. 13B shows the same at time t2, FIG. 13C shows the same at time t3, and FIG. 13D shows the same at time t4 (t1<t2<t3<t4). In FIGS. 13A to 13D, the horizontal axis is frequency (Hz), and the vertical axis is the signal intensity (arbitrary units).

Figure 14:
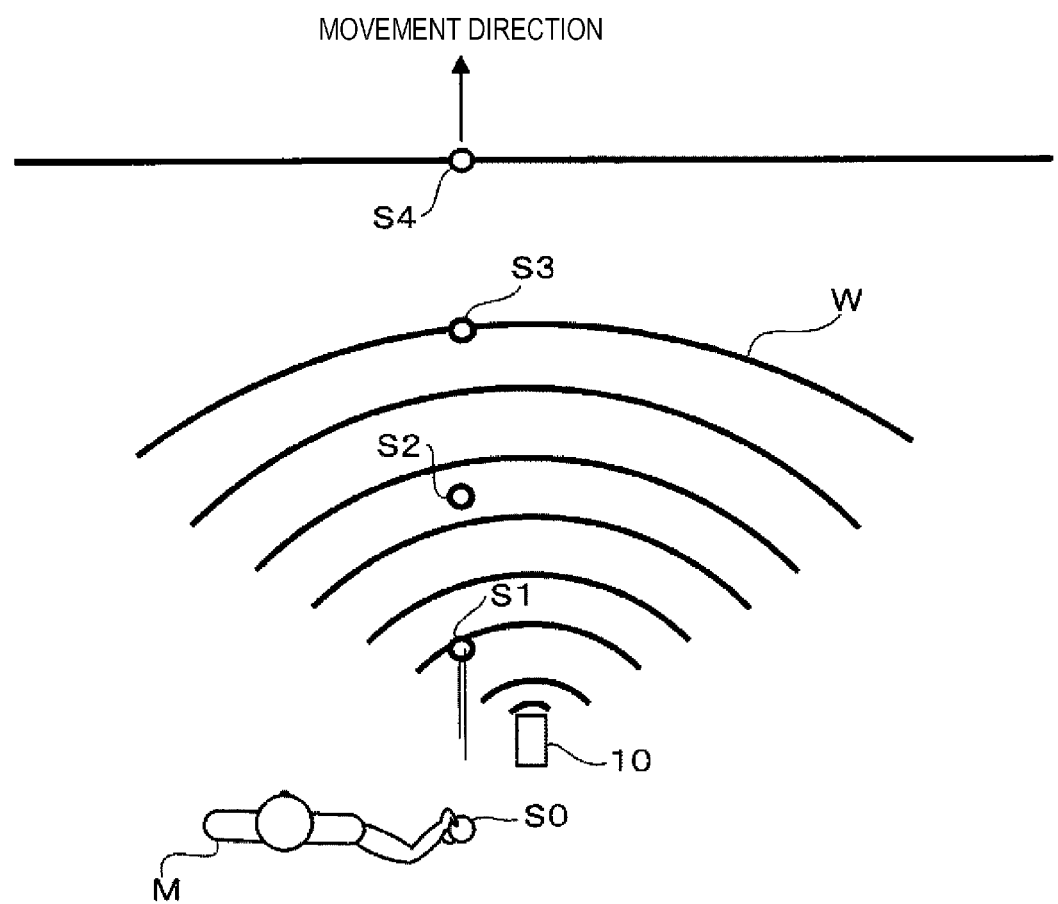
FIG. 14 is an explanatory view schematically illustrating the positions of the moving body at times t1 to t4.

Also, FIG. 14 is an explanatory view schematically illustrating the positions of the moving body at times t1 to t4. In FIG. 14, the position S0 is the movement starting point of the moving body, and the wave front W is the wave front of the transmission wave transmitted by the antenna 14 of the rotation speed measurement device 10. The moving body (baseball ball 6) that has started movement from the position S0 passes the point S1 near the rotation speed measurement device 10 at time t1, the point S2 at time t2, the point S3 at time t3, and arrives at the point S4 where the wave front W is substantially a planar wave front at time t4.

FIG. 13A shows the signal intensity distribution data P when passing near the rotation speed measurement device 10 at time t1 as illustrated in FIG. 14. In the four graphs shown in FIGS. 13A to 13D, the larger the value of the signal intensity ST the wider the width SW of the signal intensity distribution.

Also, as shown in FIGS. 13B to 13D, as time passes (in other words, as the distance between the moving body and the rotation speed measurement device 10 increases), the value of the signal intensity ST becomes smaller, and the width SW of the signal intensity distribution becomes narrower.

On the other hand, the frequency (peak frequency) PK corresponding to the peak value of the signal intensity distribution increases as time passes (in other words, as the distance between the moving body and the rotation speed measurement device 10 increases).

This is because, as illustrated in FIGS. 10A and 10B, when the moving body is near the rotation speed measurement device 10 (for example, time t1, FIG. 13A), a measurement error in the speed is produced based on the angular error, and the movement speed is measured slower than the actual speed. On the other hand, when the position of the moving body has reached sufficient distance that the angular error can be ignored (for example t4, FIG. 13D), the distance between the moving body and the rotation speed measurement device 10 has increased, so not only is the signal intensity reduced, but also the angular error is eliminated, so the value of the frequency approaches the value that indicates the true movement speed.

Returning to FIG. 11, the speed and rotation speed calculation unit 30B calculates the movement speed and rotation speed of the moving body based on the signal intensity distribution data P. In more detail, the speed and rotation speed calculation unit 30B calculates the movement speed using the peak value PK of the Doppler frequency. In addition, it calculates the rotation speed of the moving body using the width SW of a predetermined frequency band with the peak value as center (in more detail, using the signal intensity distribution data of the Doppler signal Sd at the time that the width SW takes its maximum value). The predetermined frequency band with the peak value as the center indicates the width between the points on the high frequency side and the low frequency side of the Doppler frequency at which the signal intensity is a predetermined level lower than the peak value. In other words, it is the width between the point on the high frequency side of the Doppler frequency at which the signal intensity is a predetermined level lower than the peak value, and the point on the low frequency side of the Doppler frequency at which the signal intensity is the predetermined level lower than the peak value.

Also, the speed and rotation speed calculation unit 30B may calculate the movement speed using the peak value of the Doppler frequency, and calculate the rotation speed using the width between the point on the high frequency side of the Doppler signal with a value of signal intensity that is lower than the peak value by a predetermined level, and the point that takes the peak value. This is because there is a higher possibility that the low frequency side will include noise components due to obstacles (for example, the body of the pitcher pitching the baseball ball 6, or the like) other than the moving body, compared with the high frequency side.

In the present embodiment, the speed and rotation speed calculation unit 30B calculates the movement speed using the maximum value of the peak value PK from the Doppler signal that is continuously obtained during a predetermined measurement period (for example, FIGS. 13A to 13D), and calculates the rotation speed using the maximum value of the width SW of the frequency band. Taking the example in FIGS. 13A to 13D, the movement speed is calculated using the peak value (peak frequency) PK in FIG. 13D, and the rotation speed is calculated using the frequency width SW in FIG. 13A. The specific calculation equations are equations (1) to (6) above.

Note that in the speed and rotation speed calculation unit 30B, the movement speed and rotation speed may be calculated by carrying out calibration in advance on the information for each of the diameters of the spherical body (for example, for each type of ball for a ball game), and generating a correlation equation between the peak frequency PK and the movement speed, and generating a correlation equation between the frequency width SW and the rotation speed, and the correlation equations are selected based on the diameter information input to the input unit 20. This is because during actual measurement various types of noise is generated that can cause measurement errors, and by using the correlation equations a movement speed and rotation speed closer to the true values can be calculated from the measurement data.

The control unit 32 receives the operation from the input unit 20, and sets the measurement mode to any one of the golf mode, the batting mode, and the ball mode.

Also, the control unit 32 causes the calculated movement speed and rotation speed of the moving body to be displayed on the display unit 18.

Next, the operation of the rotation speed measurement device 10 is described. The following is a description of measurement of the movement speed and the rotation speed of the baseball ball 6 pitched with a hand H of a user M using the rotation speed measurement device 10, for the case that the moving body is the baseball ball 6.

Figure 15:
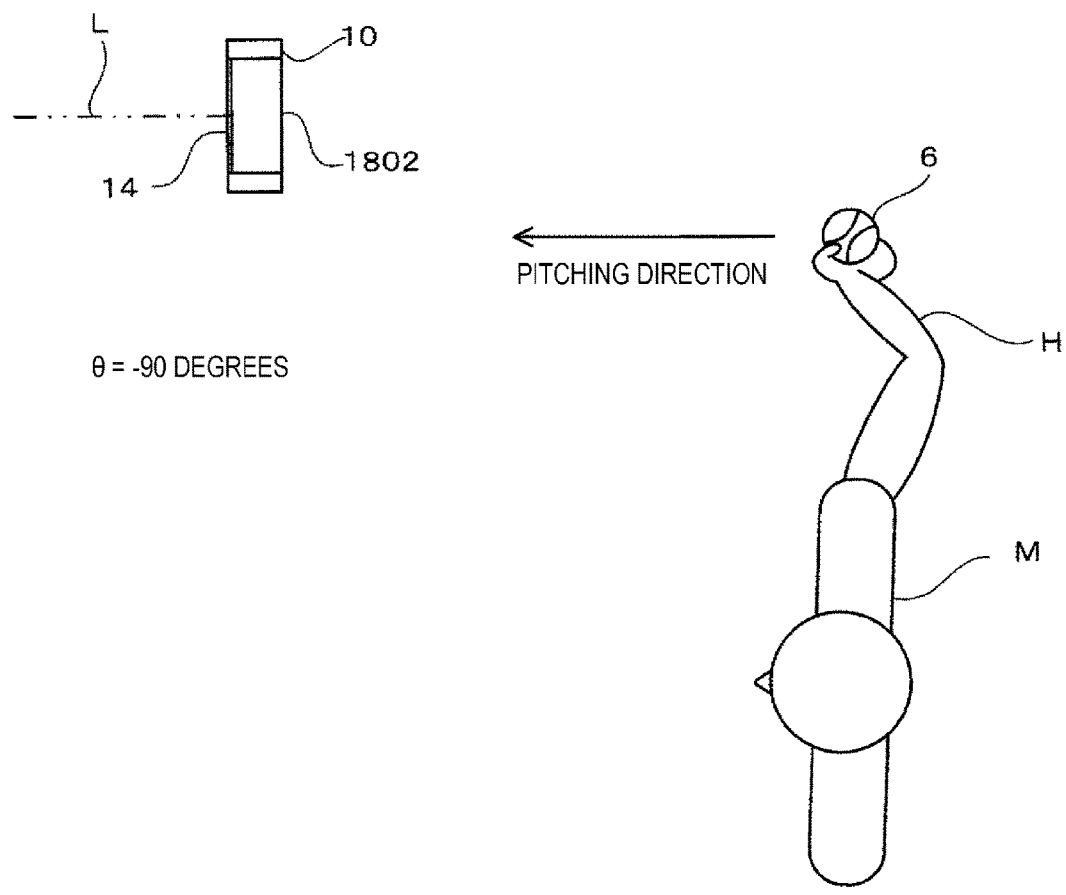
FIG. 15 is a plan view describing the status of installation of the rotation speed measurement device 10 when measuring the baseball ball 6 as the moving body.

FIG. 15 is a plan view describing the status of installation of the rotation speed measurement device 10 when measuring the baseball ball 6 moving body. Also FIG. 16 is a flowchart of the operation of the rotation speed measurement device 10 when measuring the baseball ball 6 as the moving body.

Figure 16:
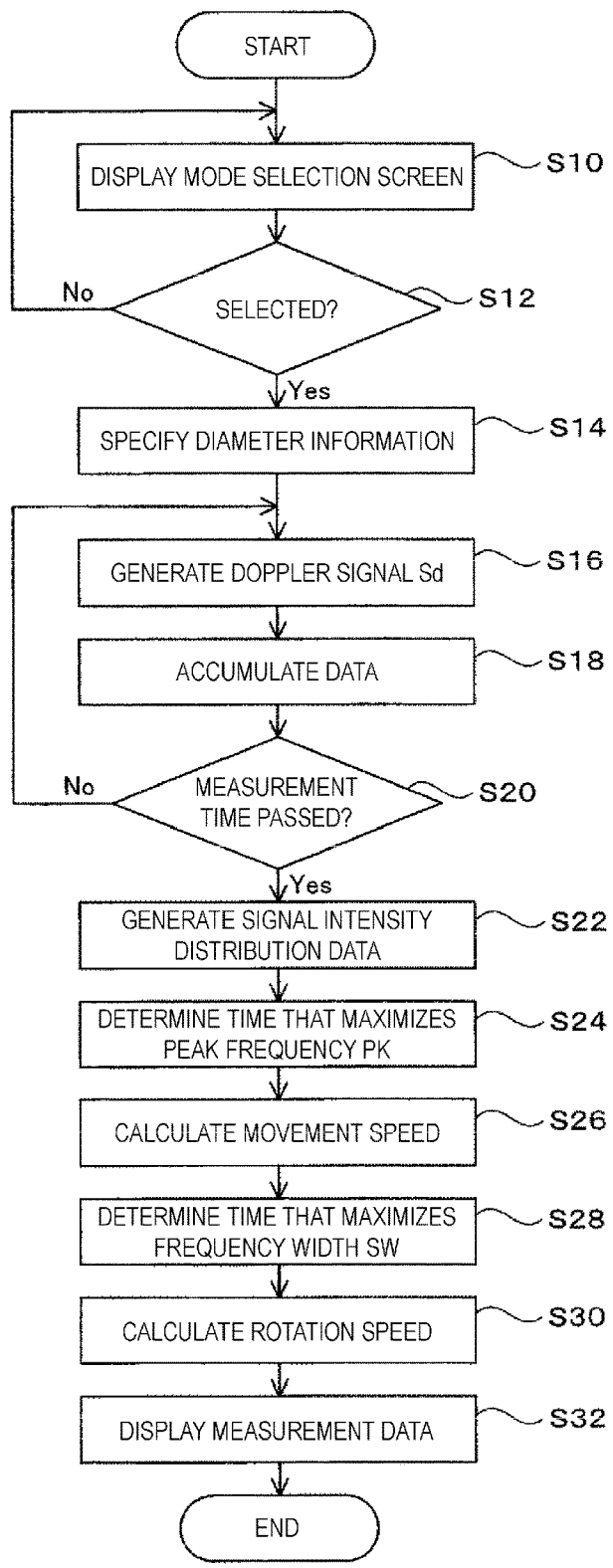
FIG. 16 is a flowchart illustrating the operation of the rotation speed measurement device 10.

As illustrated in FIG. 16, first, the rotation speed measurement device 10 displays the mode selection screen on the display surface 1802 (step S10), and waits until a measurement mode is selected (step S12: No loop). The user M operates the mode selection button to select the measurement mode of the rotation speed measurement device 10. In the present embodiment, the user M selects the ball mode from among the golf mode, the batting mode, and the ball mode. Note that instead of the mode selection screen, a screen for inputting the diameter or radius of the spherical body that is to be the moving body may be displayed.

When the measurement mode is selected (step S12: Yes), the rotation speed measurement device 10 specifies the diameter information for the ball for a ball game that is to be the moving body in the selected mode (step S14).

Next, the user M installs the rotation speed measurement device 10 in a position for example about 1.5 m to 2.0 m to the front of the standing position of the user M in the pitching direction of the baseball ball 6 (the direction along the line joining the home base and the pitcher), as illustrated in FIG. 15.

In other words, the top surface 1202 (display surface 1802) of the rotation speed measurement device 10 is oriented in the opposite direction to the pitching direction, the front surface 1204 is oriented upwards, and the rear surface 1206 is oriented towards the ground surface. Then, the antenna angle θ of the antenna 14 is adjusted so that the imaginary axis L coincides with the pitching direction.

In this case, the antenna angle θ is, for example, −90 degrees.

The rotation speed measurement device 10 may be installed on the ground surface, or, it may be installed on a fixing device such as a tripod.

In this way, the attitude is such that the transmission wave W1 transmitted from the antenna 14 is incident on the baseball ball 6, and the reflection wave W2 can be received by the antenna 14.

Also, the attitude is such that the user M can easily see the display surface 1802.

Note that when measuring the movement speed and rotation speed of balls for other ball games such as a golf ball or the like, the rotation speed measurement device 10 is also installed in a position about 1.5 m to 2.0 m to the front of the movement starting position of the moving body.

Next, when the user M pitches the baseball ball 6 with their hand H, the measurement operation is executed by the rotation speed measurement device 10.

Specifically, the transmission wave W1 is reflected by the baseball ball 6, the reflection wave W2 is received by the Doppler sensor 22, and the Doppler signal Sd is generated by the Doppler sensor 22 (step S16).

The Doppler signal Sd is sampled at the sampling period by the accumulation unit 28 and accumulated in the accumulation unit 28 as time series data (step S18).

Until a predetermined measurement time has passed (step S20: No loop), the routine returns to step S16, and generation and accumulation of the Doppler signal Sd is continued. When the predetermined measurement time has passed (step S20: Yes), the signal intensity distribution data generation unit 30A generates the signal intensity distribution data P at each sample time within the measurement time (step S22).

Next, the speed and rotation speed calculation unit 30B identifies the time at which the value of the frequency peak PK is at its maximum from among the signal intensity distribution data P generated in step S22 (step S24). Also, the speed and rotation speed calculation unit 30B calculates the movement speed of the baseball ball 6 using the peak frequency PK at the identified time (step S26).

Also, the speed and rotation speed calculation unit 30B identifies the time at which the width SW of the frequency band is at its maximum from among the signal intensity distribution data P generated in step S22 (step S28). Then, the speed and rotation speed calculation unit 30B calculates the rotation speed of the baseball ball 6 using the width SW of the frequency band at the identified time (step S30). At this time, the diameter information specified in step S14 is used for calculating the rotation speed.

Then, the control unit 32 displays information including the movement speed calculated in step S26 and the rotation speed calculated in step S30 on the display surface 1802 as measurement data (step S32), and the measurement operation terminates.

Note that the format for displaying the measurement data is optional. Specifically, either one or both of the movement speed and the rotation speed may be displayed by carrying out an operation on the input unit 20 to set a display mode that, for example, selects the display format, and this operation is received by the control unit 32.

As described above, according to the rotation speed measurement device 10 of the present embodiment, the rotation speed and the movement speed of the moving body can be measured in a comparatively low frequency region using the Doppler signal Sd, so the rotation speed and the movement speed of the moving body can be measured with a simple configuration.

Also, the rotation speed measurement device 10 calculates the movement speed using the maximum value of the peak frequency and calculates the rotation speed using the maximum value of the frequency width SW from the Doppler signal Sd that is continuously obtained during a predetermined measurement period. In this way, even when the moving body is moving close to the rotation speed measurement device 10, it is difficult for the angular error to affect the measurement, so the measurement accuracy can be improved.

Also, with the rotation speed measurement device 10, the diameter information of the spherical body that is the moving body is input via the input unit 20, so the diameter information that is indispensable for calculation of the rotation speed of the moving body can be easily acquired. For example, if the type of ball for a ball game is input from the input unit 20, the rotation speed can be measured even if the user does not directly know the diameter information of the spherical body. Also, if, for example, the value of the diameter of the spherical body is input from the input unit 20, measurement can be carried out even in cases where a special size spherical body is used.

Also, in the rotation speed measurement device 10, if correlation equations are generated in advance for the diameter information of each spherical body, and the movement speed and rotation speed are calculated by selecting the correlation equations based on the diameter information, the effect of various types of noise produced during measurement can be reduced, and the accuracy of calculation of the movement speed and the rotation speed can be increased.

Also, in the rotation speed measurement device 10, if frequency band of the transmission wave is 24 GHz or 10 GHz, the versatility of the rotation speed measurement device 10 can be increased.

Also, in the rotation speed measurement device 10, by making the transmission wave output not more than 10 mW, the electrical power consumption of the rotation speed measurement device 10 can be reduced, so the practical utility when the rotation speed measurement device 10 is driven by battery can be improved.

Also, in the rotation speed measurement device 10, if the antenna 14 and the Doppler sensor 22 are integrally provided configured as an integrated module, the rotation speed measurement device 10 can be further reduced in size, and its transportability can be improved. Also, the installation area of the rotation speed measurement device 10 can be reduced, so it will not cause an obstruction if it is installed near the user or the like.

Also, by driving the rotation speed measurement device 10 using electrical power accumulated in a battery, measurement can be carried out without having to select the measurement location, and the convenience of the rotation speed measurement device 10 can be increased.

Also, in the present embodiment, the support of the antenna 14 by the antenna support 16 enables the antenna angle θ formed between the imaginary axis L and an imaginary plane P parallel to the flat display surface 1802 of the display unit 18 to be changed in a range of ±90 degrees.

Therefore, the orientation of the display surface 1802 and the orientation of the imaginary axis L can be adjusted from being in the same orientation to being in the opposite orientation, which has the advantage that the visibility of the display unit 18 and the measurement accuracy of the movement speed of the moving body can be both improved.

Also, in the present embodiment, in the case of the ball mode, the example of a baseball ball was taken, but any moving body may be the target of measurement, such as a golf ball, a soccer ball, a volleyball, a tennis ball, a hand ball, or, a shot used in throwing events.

The invention claimed is:

1. A moving body rotation speed measurement device, comprising:
   an antenna having directivity, that transmits a transmission wave to a spherical moving body based on a supplied transmission signal, and receives a reflection wave reflected at the moving body and generates a received signal;
   a Doppler sensor that supplies the transmission signal to the antenna, and generates a Doppler signal having a Doppler frequency based on the received signal;
   an input unit to which diameter information of the spherical body is input;
   a measurement processing unit that calculates a movement speed and a rotation speed of the moving body based on the Doppler signal and the diameter information, wherein the movement speed is a speed of movement of the moving body as the moving body moves from one position to a second position in a direction of movement;
   a display unit that displays display contents including the calculated movement speed and rotation speed; and
   a casing that retains at least the display unit; wherein
   the antenna transmits the transmission wave and receives the reflected wave continuously during a predetermined measurement time,
   the Doppler sensor continuously supplies the transmission signal and generates the Doppler signal during the predetermined measurement time, and
   the measurement processing unit converts the Doppler signal at each time in the predetermined measurement time into signal intensity distribution data, calculates the movement speed of the moving body using the maximum value of the peak value of the Doppler frequency in the signal intensity distribution data during the predetermined measurement time, and calculates the rotation speed using the signal intensity distribution data of the Doppler signal at the time when the distribution width of the signal intensity distribution data has a maximum value.

2. The moving body rotation speed measurement device according to claim 1, wherein the measurement processing unit calculates the rotation speed using the width between a point on the high frequency side of the Doppler signal having a value of signal intensity that is lower than the peak value by a predetermined level, and a point on the low frequency side of the Doppler signal having a value of signal intensity that is lower than the peak value by a predetermined level.

3. The moving body rotation speed measurement device according to claim 1, wherein the measurement processing unit calculates the rotation speed using the width between a point on the high frequency side of the Doppler signal having a value of signal intensity that is lower than the peak value by a predetermined level, and the point that takes the peak value.

4. The moving body rotation speed measurement device according to claim 3, wherein the measurement processing unit calculates the rotation speed of the spherical body by calculating a speed using the reflection wave from a first portion of the surface of the spherical body that makes an angle of about 90° with the transmission direction of the transmission wave, a second portion that makes an angle of about 0° with the transmission direction of the transmission wave and the rotation direction of the spherical body is in the opposite direction to the movement direction of the spherical body, and a third portion that makes an angle of about 0° with the transmission direction of the transmission wave and the rotation direction of the spherical body is in the same direction as the movement direction of the spherical body respectively, a first speed calculated using the reflection wave from the first portion indicating the movement speed of the spherical body, a second speed calculated using the reflection wave from the second portion indicating the value of first movement speed from which the product of the angular velocity of the spherical body and the radius of the spherical body has been deducted, and a third speed calculated using the reflection wave from the third portion indicating the value of first movement speed to which the product of the angular velocity of the spherical body and the radius of the spherical body has been added, and calculates the angular velocity of the spherical body from the first speed, the second speed, and the third speed.

5. The moving body rotation speed measurement device according to claim 4, wherein the measurement processing unit calculates the rotation speed of the spherical body taking the component of the reflection wave from the first portion to be a component of the Doppler signal frequency distribution data with relatively high signal intensity, the component of the reflection wave from the second portion to be a component within the component with relatively low signal intensity with a frequency lower than the component of the reflection wave from the first portion, and the reflection wave from the third portion to be a component within the component with relatively low signal intensity with a frequency higher than the component of the reflection wave from the first portion.

6. The moving body rotation speed measurement device according to claim 5, wherein the spherical body is a ball for a ball game, the type of ball for a ball game is input to the input unit, and the measurement processing unit stores a diameter of the type of the ball for a ball game input to the input unit.

7. The moving body rotation speed measurement device according to claim 6, wherein the value of the diameter of the spherical body is input to the input unit.

8. The moving body rotation speed measurement device according to claim 7, wherein the measurement processing unit has correlation equations for calculating the movement speed and the rotation speed from the Doppler frequency for the diameter information of each spherical body in advance, and calculates the movement speed and the rotation speed by selecting the correlation equations based on the diameter information input to the input unit.

9. The moving body rotation speed measurement device according to claim 8, wherein the frequency band of the transmission wave is 24 GHz or 10 GHz, and the transmission wave output is not more than 10 mW.

10. The moving body rotation speed measurement device according to claim 9, wherein the antenna and the Doppler sensor are configured as an integrally provided integrated module.

11. The moving body rotation speed measurement device according to claim 10, further comprising a battery that stores electrical power, wherein the device is driven using the electrical power stored in the battery.

12. The moving body rotation speed measurement device according to claim 1, wherein the measurement processing unit calculates the rotation speed of the spherical body by calculating a speed using the reflection wave from a first portion of the surface of the spherical body that makes an angle of about 90° with the transmission direction of the transmission wave, a second portion that makes an angle of about 0° with the transmission direction of the transmission wave and the rotation direction of the spherical body is in the opposite direction to the movement direction of the spherical body, and a third portion that makes an angle of about 0° with the transmission direction of the transmission wave and the rotation direction of the spherical body is in the same direction as the movement direction of the spherical body respectively, a first speed calculated using the reflection wave from the first portion indicating the movement speed of the spherical body, a second speed calculated using the reflection wave from the second portion indicating the value of the first speed from which the product of the angular velocity of the spherical body and the radius of the spherical body has been deducted, and a third speed calculated using the reflection wave from the third portion indicating the value of the first speed to which the product of the angular velocity of the spherical body and the radius of the spherical body has been added, and calculates the angular velocity of the spherical body from the first speed, the second speed, and the third speed.

13. The moving body rotation speed measurement device according to claim 12, wherein the measurement processing unit calculates the rotation speed of the spherical body taking the component of the reflection wave from the first portion to be a component of the Doppler signal frequency distribution data with relatively high signal intensity, the component of the reflection wave from the second portion to be a component within the component with relatively low signal intensity with a frequency lower than the component of the reflection wave from the first portion, and the reflection wave from the third portion to be a component within the component with relatively low signal intensity with a frequency higher than the component of the reflection wave from the first portion.

14. The moving body rotation speed measurement device according to claim 1, wherein the spherical body is a ball for a ball game, the type of ball for a ball game is input to the input unit, and the measurement processing unit stores a diameter of the type of the ball for a ball game input to the input unit.

16. The moving body rotation speed measurement device according to claim 1, wherein the measurement processing unit has correlation equations for calculating the movement speed and the rotation speed from the Doppler frequency for the diameter information of each spherical body in advance, and calculates the movement speed and the rotation speed by selecting the correlation equations based on the diameter information input to the input unit.

16. The moving body rotation speed measurement device according to claim 1, wherein the frequency band of the transmission wave is 24 GHz or 10 GHz, and the transmission wave output is not more than 10 mW.

17. The moving body rotation speed measurement device according to claim 1, wherein the antenna and the Doppler sensor are configured as an integrally provided integrated module.

18. The moving body rotation speed measurement device according to claim 1, further comprising a battery that stores electrical power, wherein the device is driven using the electrical power stored in the battery.

19. A moving body rotation speed measurement device, comprising:
   an antenna having directivity, that transmits a transmission wave to a spherical moving body based on a supplied transmission signal, and receives a reflection wave reflected at the moving body and generates a received signal;
   a Doppler sensor that supplies the transmission signal to the antenna, and generates a Doppler signal having a Doppler frequency based on the received signal;
   an input unit to which diameter information of the spherical body is input;
   a measurement processing unit that calculates a movement speed and a rotation speed of the moving body based on the Doppler signal and the diameter information, wherein the movement speed is a speed of movement of the moving body as the moving body moves from one position to a second position in a direction of movement;
   a display unit that displays display contents including the calculated movement speed and rotation speed; and
   a casing that retains at least the display unit;
   wherein the measurement processing unit has correlation equations for calculating the movement speed and the rotation speed from the Doppler frequency for the diameter information of each spherical body in advance, and calculates the movement speed and the rotation speed by selecting the correlation equations based on the diameter information input to the input unit.

20. A moving body rotation speed measurement device, comprising:
   an antenna having directivity, that transmits a transmission wave to a spherical moving body based on a supplied transmission signal, and receives a reflection wave reflected at the moving body and generates a received signal;
   a Doppler sensor that supplies the transmission signal to the antenna, and generates a Doppler signal having a Doppler frequency based on the received signal;
   an input unit to which diameter information of the spherical body is input;
   a measurement processing unit that calculates a movement speed and a rotation speed of the moving body based on the Doppler signal and the diameter information, wherein the movement speed is a speed of movement of the moving body as the moving body moves from one position to a second position in a direction of movement;
   a display unit that displays display contents including the calculated movement speed and rotation speed; and
   a casing that retains at least the display unit;
   wherein the measurement processing unit calculates the rotation speed using the width between a point on the high frequency side of the Doppler signal having a value of signal intensity that is lower than the peak value by a predetermined level and: a point on the low frequency side of the Doppler signal having a value of signal intensity that is lower than the peak value by a predetermined level, or the point that takes the peak value.

* * * * *